Figure 1:
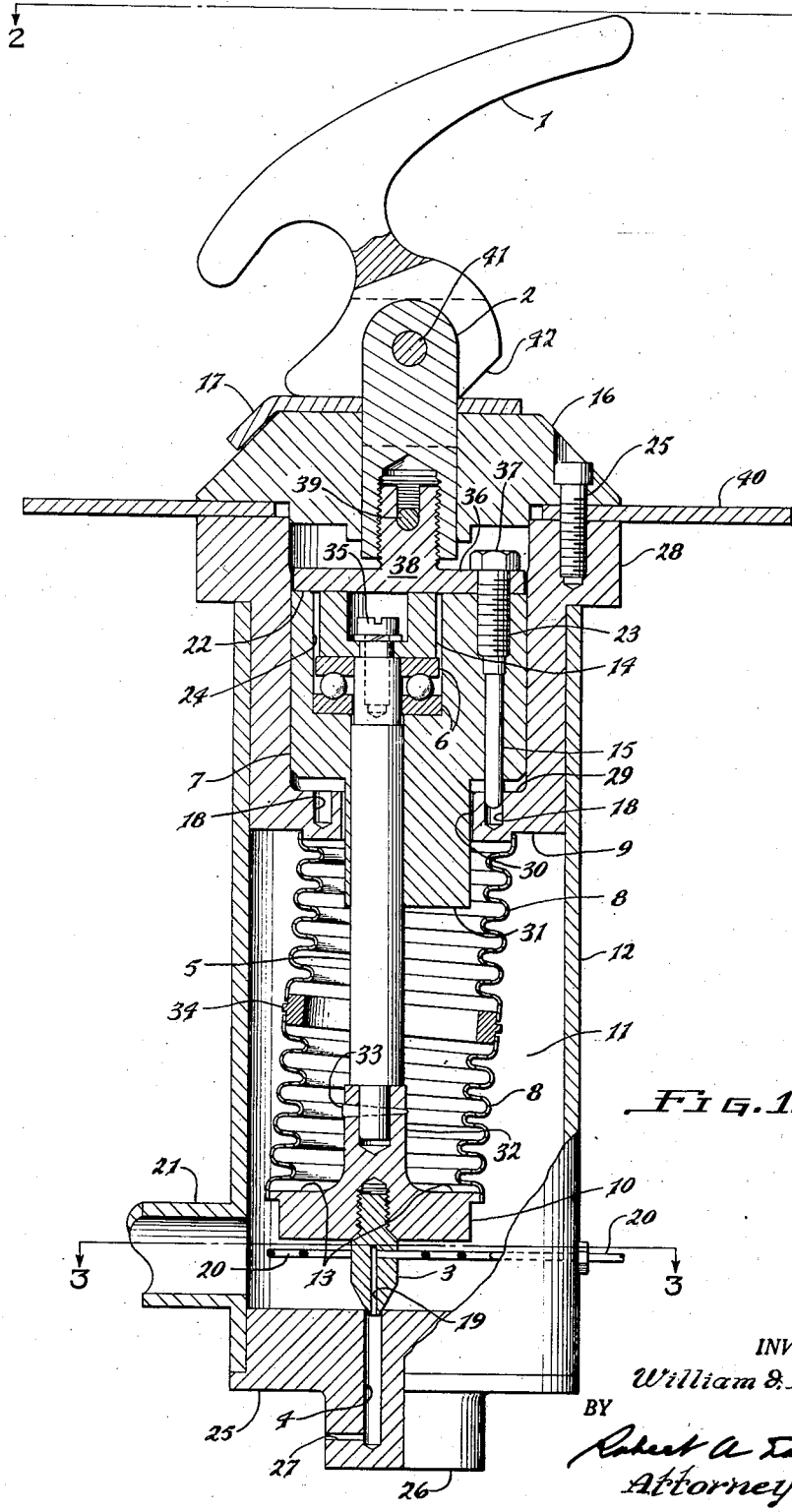

Sept. 16, 1958

W. J. STINSON 2,852,041

FLUID SELECTING APPARATUS

Filed Jan. 16, 1946

2 Sheets-Sheet 1

INVENTOR.
William J. Stinson
BY
Robert A. Favender
Attorney

Sept. 16, 1958     W. J. STINSON     2,852,041
FLUID SELECTING APPARATUS
Filed Jan. 16, 1946     2 Sheets-Sheet 2

INVENTOR.
William J. Stinson
BY
Robert A. Townsend
Attorney

United States Patent Office 2,852,041
Patented Sept. 16, 1958

2,852,041

FLUID SELECTING APPARATUS

William J. Stinson, Oak Ridge, Tenn., assignor to the United States of America as represented by the United States Atomic Energy Commission Application January 16, 1946, Serial No. 641,624

8 Claims. (Cl. 137—625.11)

This invention relates to an improved device for selectively sampling fluid from a plurality of sources thereof, or in other words, it relates to improvements in a device for placing a single conduit into communication with or into fluid flow relationship with any one of a plurality of conduits or orifices. The improvements of this invention are particularly concerned with the means for effecting the sampling operation, that is, the means for placing a single conduit into communication with any one of a plurality of conduits.

In devices of this general character operating means are customarily provided whereby a valve-like device can be seated and unseated by reciprocation of the actuating means. The device can be moved from one orifice to another and placed in fluid flow relationship therewith by rotation of the actuating means.

It is an object of my invention to provide actuating means consisting of a single handle arranged so that only one manipulation is necessary for both the seating and unseating operations and the movement from one orifice or outlet to another.

This type of device finds application in gas processing systems for example, wherein it is desired to quickly take successive samples for analysis of different gases, conveying the sample to be analyzed to a single analyzing instrument. The gases may be highly toxic and corrosive, and of course for proper analysis the samples must be kept separate and it must be possible to take the samples and make the analyses quickly. Thus the need for the improvements of this invention become apparent. In this type of device the operating means may comprise a stem which is customarily sealed by means of a sealing bellows and it has been found necessary that in order to provide a bellows of a material which is sufficiently corrosion resistant, and at the same time to provide sufficient flexibility thereof, to employ a relatively fragile construction. Provision must be made therefore to protect the bellows against undue stresses resulting from flexing and working of the bellows during operation of the sampling device. Torsional stresses resulting from twisting of the bellows are particularly harmful to the bellows and it is particularly an object of my invention to provide a device which does not subject the sealing bellows to torsional stresses. In devices of this general nature it is common to provide a sealing bellows which is free to move about at one end, the free end being sealed to the member which is moved about to be placed in fluid flow relationship with any one of the plurality of outlet orifices. It is convenient that the orifices be arranged in a circle and that the actuating means for the free end of the bellows include an element which is moved circularly, that is a stem which moves the free end of the bellows correspondingly, that is in a circle. It is another object of my invention to provide means including a ball bearing in the connection between the free end of the bellows and the operating stem so that the operating stem can be moved circularly without rotation about its own axis and therefore without twisting the free end of the bellows and thus in this manner obviating the setting up of torsional stresses in the bellows.

It is another object of my invention to provide a device as in the foregoing object wherein there is a pressure differential between the interior and the exterior of the bellows which tends to expand the bellows thereby tending to complete the seating action of the movable conduit forming means, that is, the valve-like device in the outlet orifices and this pressure differential tending to produce a thrust in the operating stem which is taken by the bearing.

Figure 2:
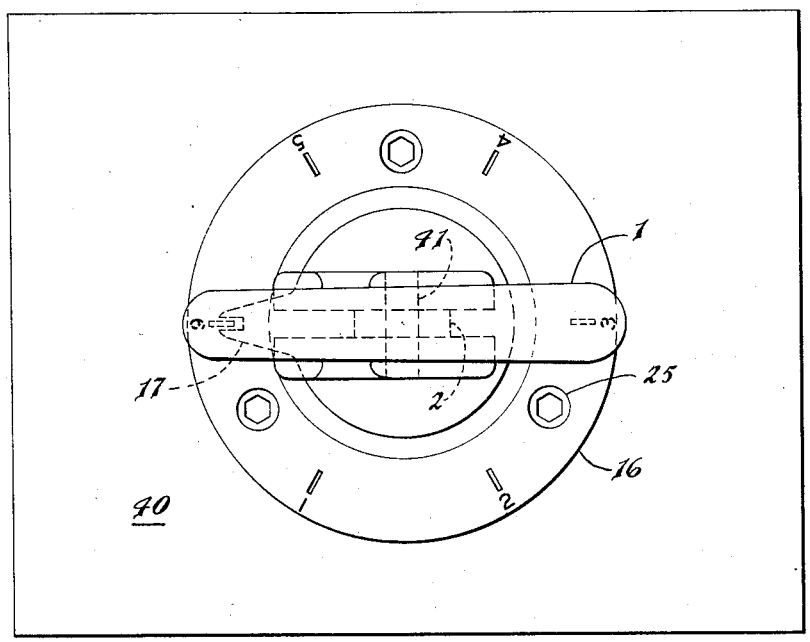
Figure 3:
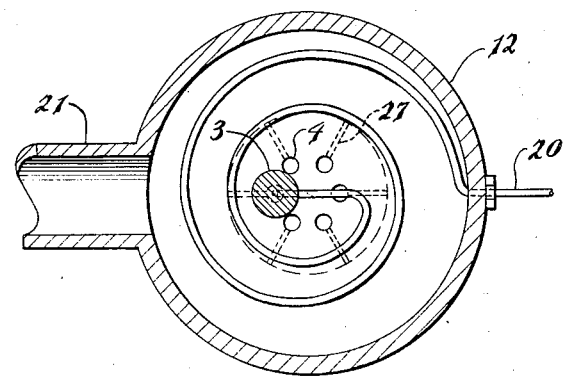

Further objects and numerous other advantages of my invention will become apparent from the following description and attached drawings wherein Figure 1 is a vertical cross sectional view of the apparatus of my invention. Figure 2 is a top or plan view of the device of Figure 1. Figure 3 is a sectional view taken along the line 3—3 of Figure 1.

As referred to in the foregoing introduction, my invention is concerned with taking a sample from any one of a plurality of sources of fluid and conveying the said sample to a single analyzing instrument or testing device. This is accomplished in my invention by manually adjusting an orifice plug connected by a flexible conduit to the analyzing instrument to any one of a plurality of spaced outlet orifices so as to place any one of the orifices in communication through the flexible conduit with the analyzing instrument. The orifice plug is adapted to engage any one of the outlet orifices in fluid-tight relationship. To accomplish the necessary movement, that is, adjustment of the orifice plug there is provided an operating stem which is manually actuatable, and which is sealed with a Sylphon bellows surrounding the stem. As set forth in the foregoing, it is particularly the object of my invention to provide means for adjusting the orifice plug, which necessitates flexing of the bellows, without producing unusual stresses in the bellows tending to wear it out and cause it to rupture and particularly to avoid twisting the bellows and to thereby produce torsional stress therein. The manner in which my invention is achieved will become more apparent as the ensuing detailed description proceeds.

Referring to the drawing, the apparatus comprises a generally cylindrical casing 12 which is closed at the bottom by a plug member 25 having a downwardly extending boss portion 26. Plug member 25 has a plurality of circularly arranged orifices or channels 4 which are arranged around the central axis of the plug member 25. Each of the channels 4 communicates with a radial channel or orifice 27 and the orifices 27 connect to the various sources of fluid medium to be analyzed (not shown) (see Fig. 3). At the lower part of the casing 12 is a relatively large evacuating outlet 21 which is connected to a vacuum producing means which maintains the interior of the casing 12 at relatively low pressure.

Fitting within the upper end of the casing 12 is a cylindrical sleeve member 9 which is flanged at the top as shown at 28, the flange being of larger diameter than the casing 12 as shown. The sleeve member 9 has an internal bore 29 and it has a bottom portion having an aperture 30 therein of smaller diameter than the bore 29 and surrounding the aperture 30 are a plurality of tapped openings or recesses, that is, circular tapped holes 18 which are arranged in a circle around the aperture 30. Fitting within the bore 29 is a piston-like member 7 or spool which may be both rotated and reciprocated within the bore 29 as will be described. The piston member 7 has a downwardly extending cylindrical portion 31 which extends through aperture 30 in the sleeve member 9. The piston member 7 has a vertical bore therein which is eccentric with reference to the piston member 7, that is, it is offset slightly from the center of the piston member 7 as shown and there is a stem 5 which extends through this bore, that is, it is fitted in this bore and its lower end is attached to a disc member 10, the disc member 10 having an upstanding central portion 32 with a tapped hole therein as shown. The lower end of stem 5 is smaller and it fits in the tapped hole in the upper end of portion 32 of member 10 and is attached to portion 32 by a key or pin 33. The lower part of the sleeve member 9 is sealingly connected to the disc 10 by a Sylphon bellows in two parts designated by the numerals 8. The upper part of the Sylphon bellows 8 is sealed to a downwardly extending boss on sleeve 9 and the lower part of the Sylphon bellows 8 is sealed to a flange on the disc 10 as shown. The two parts 8 of the Sylphon bellows are both sealed to an intermediate ring member 34 as shown. The Sylphon bellows is therefore relatively long for reasons which will presently become apparent.

The lower side of the disc 10 has a tapped screw threaded opening which engages a nipple or orifice plug 3 which has a central orifice or channel 19, the inner end of which is connected to a flexible tube 20 which is wound generally in a helix around the nipple 3 and which extends to the exterior of casing 12 as shown. The lower part of the nipple member 3 has tapering sides and is in the form of a valve member and is adapted to fit into and sealingly engage with any one of the outlet orifices 4 (see Fig. 3). The nipple member 3 may be moved into and out of engagement with the orifices 4 in a manner which will be presently described.

The piston member 7 has a larger bore 24 concentric with the bore, that is the counter bore, in which the stem 5 fits.

In the bore 24 is a ball bearing consisting of ball retainers or plates 6 which are grooved to form a ball race between them, the balls being in the ball race in the usual manner as shown. The lower retainer plate 6 fits snugly in the bore 24 and the upper retainer plate is slightly smaller in diameter as shown. The upper end of the stem 5 is slightly smaller in diameter and it extends through a bushing 14 disposed within the bore 24 above the ball bearing. The bushing 14 has an internal cavity large enough to receive the head of a screw 35 which screws into a tapped hole in the end of the stem 5 holding the bushing 14 and the upper ball bearing retaining plate 6 in assembled relationship, there being a washer under the head of the screw 35 as shown. The ball bearing assembly described constitutes what is in effect a bearing that operates in the manner of a thrust bearing, this bearing permitting relative rotation between the stem 5 and the assembly comprising the piston 7, for purposes which will presently become apparent. That is, the piston 7 is permitted to freely rotate by the ball bearing assembly with the stem 5 moving in space, that is, moving bodily without rotating around its own axis.

Numeral 36 designates a flat circular cap attached to the top of the piston member 7 and covering the bore 24, this member being attached to the member 7 by a cap screw 37 having a downwardly projecting plunger portion 15 of smaller diameter which extends entirely through the portion of piston 7 of large diameter and is adapted to register with and engage with any one of the tapped openings 18. The piston 7, that is the entire assembly comprised of the piston 7, may be lifted as will be described so as to disengage the plunger 15 from one of the openings 18 and then rotated until the plunger 15 is in registry with another opening 18, the assembly then being allowed to drop so that the plunger 15 engages in a new opening 18, the arrangement thus operating to register and latch the piston assembly in selective predetermined positions. The cap member 36 has a central upstanding screw threaded portion 38 which engages in screw threaded relationship in a tapped screw threaded hole in the lower end of a bracket member 2, these two parts being fastened by a pin or key 39 as shown preventing relative rotation therebetween. The bracket member 2 fits centrally in an opening in a dial plate member 16 which has slanting upper sides as shown and which is attached to the sleeve member 9 by cap screws 25 as shown, the heads of which are counter sunk in the sidewalls of the dial plate 16 (see Figs. 1 and 2). The dial plate 16 does not directly engage the upper part of sleeve member 29 there being a supporting plate or panel 40 interposed therebetween, the panel 40 having a circular opening therein and the edges adjacent this opening being interposed between the dial plate 16 and the upper part 28 of sleeve member 29. The upper end of the bracket 2 is flattened and attached to operating handle 1 which is bifurcated so as to form a yoke, that is, bracket 2 is pivoted between the arms of the yoke, the handle being journalled on a pivot designated at 41 (see Fig. 2). Attached to the bracket 2 is a pointer 17 having a portion bent down so as to move adjacent the tapering sides of the dial plate 16. The pointer 17 rotates with the bracket 2 as will be described, adjacent the faces of the dial plate 16 which is graduated in angular positions which correspond to the positions of the tapped holes 18, the positions of these holes also corresponding angularly to the positions of the orifice channels 4 in the member 25. The lower part of the operating handle 1 is flat as shown and normally bears against the central part of the pointer 17; the lower part of the operating handle 1 also has a slanting surface portion 42 so that when the handle 1 is depressed, its lower part fulcrums about the edge of the slanting portion 42, exerting leverage on the pin 41 and thus lifting the bracket 2 and the entire assembly attached thereto, that is, the piston assembly 7 is lifted with the plunger 15 being lifted out of the opening 18 and the stem 5 lifting the disc 10 and nipple 3 disengaging the latter from the outlet orifice 4 with which it was engaged. It will be observed that the lower end of bellows 8 is offset, that is displaced laterally from the upper end of the bellows and the bellows is thus flexed as shown and this lateral displacement at the lower end exists throughout the movements about to be described. With the parts thus lifted, the handle 1 is then rotated until the pointer 17 is opposite a graduation on the dial plate 16 indicative of a desired angular position or setting of the apparatus, that is, a position in which a sample will be taken from the desired channel orifice 4. The handle 1 is then released, that is, allowed to go up into the position shown on the drawing and the atmospheric pressure to which the interior of the bellows 8 is exposed will force the disc 10 and nipple 3 downwardly with the stem 5 pulling the piston assembly 7 downwardly, plunger 15 dropping into its registering opening 18 and the nipple 3 engaging with the newly selected channel orifice 4. During the rotation of the piston assembly 7 by handle 1, the stem 5 swings through an arc, that is, an arc having a radius corresponding to the radius of the circle in which the channels 4 are disposed around the central axis of the plug 25. The disc 10 at the lower end of the bellows 8 and nipple 3 of course move correspondingly, the flexibility of the coil of tubing 20 permitting the lateral displacement of the nipple 3. During this motion there is no rotation of the stem 5 around its own axis, the arrangement of my invention being provided particularly to prevent rotation of the stem 5 about its own axis. This result is achieved by reason of the fact that stem 5 is not rigidly connected to the piston 7 but is engaged therewith through the ball bearing comprised in part of retainer plates 6. Inasmuch as stem 5 does not rotate around its own axis, there is no rotation, that is, twisting of disc 10 and the lower end of bellows 8, and since there is no twisting of disc 10 and the lower end of bellows 8, no torsional stresses are developed in the bellows and accordingly the bellows will be considerably longer lived than if it were to be subjected particularly to torsional stresses. Moreover, when the parts are lifted in the manner described, by the handle 1, the nipple 3 is disengaged from the end of orifice channel 4, and in these circumstances atmospheric pressure within the bellows acting downwardly on the disc 10 produces a thrust in the stem 5 which is borne by the ball bearing previously described. In other words the thrust in stem 5 acts through the screw 35 and the upper retainer plate 6 to bear down on the ball bearings and the lower retainer plate 6. Thus, as the piston 7 is rotated due to the ball bearing interposed between the piston 7 and the stem 5 there is very little frictional drag tending to rotate the stem 5 about its own axis. It will readily be observed that if the stem 5 were rigidly attached to the piston 7 that when the piston 7 was rotated, the stem 5 would rotate about its own axis twisting the bellows 8. This will be observed by noting that on the figure the slot in the top of the screw 35 is in a position normal to the plane of the paper. If the stem 5 were rigidly attached to piston 7 and piston 7 were rotated through 180°, the slot in the top of the screw 35 would then be in a position parallel to the plane of the paper indicating that the stem 5 had rotated through 180° with reference to its own axis and accordingly the disc 10 would have been rotated about its axis through 180° placing 180° of twist in the bellows 8 and thereby setting up corresponding torsional stresses.

In the manner described, the apparatus can be quickly and conveniently adjusted to any one of the orifice channels 4 for selectively taking a sample from any one of the sources and communicating it to the single analyzing instrument. The interior of the casing 12 is continuously evacuated through the outlet 21, and whenever the nipple 3 is seated in one of the orifice channels 4 atmospheric pressure within the bellows 8 firmly completes the seating action without the necessity of biasing springs. By reason of the particular arrangement described which prevents or avoids the necessity of twisting the lower end of the bellows, no torsional stresses are set up and the life of the bellows is correspondingly lengthened.

The embodiment of my invention disclosed herein is representative of its preferred form. The disclosure is to be interpreted in an illustrative rather than a limiting sense, the scope of the invention being determined in accordance with the claims appended hereto.

I claim:

1. In apparatus of the character described, in combination, means forming a fluid-tight chamber having a plurality of orifice channels communicating therewith, conduit means within the chamber and constructed and arranged to be placed in fluid flow relationship with any one of said orifice channels, means for producing relative circular motion as between the conduit means and the plurality of orifice channels comprising a stem adapted to be moved circularly, sealing means for the stem comprising a Sylphon bellows movable at one end, means for moving the stem circularly and connecting means between the movable end of the bellows and the means for moving the stem including a ball bearing to permit relative rotation between the movable end of the bellows and the means for moving the stem whereby circular motion may be imparted to the movable end of the bellows without twisting the bellows.

2. In apparatus of the character described, in combination, means forming a fluid-tight chamber having a plurality of orifice channels communicating therewith, conduit means within the chamber and constructed and arranged to be placed in fluid flow relationship with any one of said orifice channels, means for producing relative circular motion as between the conduit means and the plurality of orifice channels comprising a stem adapted to be moved circularly, sealing means for the stem comprising a Sylphon bellows movable at one end, means for moving the stem circularly and connecting means between the movable end of the bellows and the means for moving the stem including a ball bearing to permit relative rotation between the movable end of the bellows and the means for rotating the stem whereby circular motion may be imparted to the movable end of the bellows without twisting the bellows, said chamber being evacuated and said bellows having pressure therein, said pressure normally tending to expand the said bellows so as to exert a thrust in said stem, the arrangement being such that the thrust is taken by said bearing.

3. In apparatus of the character described, in combination, means forming a fluid-tight chamber having a plurality of orifice channels communicating therewith, conduit means within the chamber and constructed and arranged to be placed in fluid flow relationship with any one of said orifice channels, means for producing relative circular motion as between the conduit means and the plurality of orifice channels comprising a stem adapted to be moved circularly, sealing means for the stem comprising a Sylphon bellows movable at one end, means for moving the stem circularly and connecting means between the movable end of the bellows and the means for moving the stem including a ball bearing to permit relative rotation between the movable end of the bellows and the means for moving the stem whereby circular motion may be imparted to the movable end of the bellows without twisting the bellows, said means for moving said stem comprising a member mounted for rotary and reciprocatory motion and means comprising a manually actuatable handle so associated with said member as to be capable of imparting both rotary and reciprocatory motion thereto.

4. In apparatus of the character described, in combination, means having a plurality of orifice channels therein and conduit means including a member adapted to be placed in fluid flow relationship with any one of said orifice channels, means for actuating said member comprising a member mounted so as to be both rotatable and reciprocatable and having an actuating stem extending therefrom eccentrically as respects the axis of rotation of the rotary member whereby said first member may be placed into and out of communication with said orifice channels by reciprocation of the rotary member and said first member may be moved from one to another of said orifice channels by rotation of said rotary member.

5. In apparatus of the character described, in combination, means having a plurality of orifice channels therein and conduit means including a member adapted to be placed in fluid flow relationship with any one of said orifice channels, means for actuating said member comprising a member mounted so as to be both rotatable and reciprocatable and having an actuating stem extending therefrom eccentrically as respects the axis of rotation of the rotary member whereby said first member may be placed into and out of communication with said orifice channels by reciprocation of the rotary member and said first member may be moved from one to another of said orifice channels by rotation of said rotary member, and means comprising a Sylphon bellows for sealing said stem, said bellows being connected at one end to said first member and there being means including a ball bearing providing for relative rotation between said end of said bellows and said rotary member so that the said first-mentioned member may be moved from one orifice to another by rotating the rotary member without twisting the said bellows.

6. In apparatus of the character described, in combination, means having a plurality of orifice channels therein and conduit means including a member adapted to be placed in fluid flow relationship with any one of said orifice channels, means for actuating said member comprising a member mounted so as to be both rotatable and reciprocatable and having an actuating stem extending therefrom eccentrically as respects the axis of rotation of the rotary member whereby said first member may be placed into and out of communication with said orifice channels by reciprocation of the rotary member and said first member may be moved from one to another of said orifice channels by rotation of said rotary member, and means comprising an actuating handle so arranged as to be operable to impart both reciprocatory and rotary motion to said rotary member.

7. In an apparatus for selectively withdrawing fluids from a plurality of sources thereof, in combination, means comprising a sealing bellows, a rotatable eccentric having a stem extending therefrom, said stem being eccentrically disposed within said sealing bellows, and means comprising a single operating lever capable of imparting both reciprocating and rotating action to said eccentric.

8. In an apparatus for selectively withdrawing fluids from a plurality of sources thereof, in combination, means for selecting one of a plurality of openings circularly disposed and leading into a partially evacuated zone, a channelled needle valve associated with said openings, means for seating and unseating said channelled need valve in said selected openings, and sealing means enclosing said last mentioned means and maintaining a pressure differential between the zone enclosed thereby and said partially evacuated zone.

References Cited in the file of this patent

UNITED STATES PATENTS

| | | |
|---|---|---|
| 1,436,444 | Holmes | Nov. 21, 1922 |
| 1,702,762 | Brubaker | Feb. 19, 1929 |
| 1,731,009 | King | Oct. 8, 1929 |
| 1,791,923 | Eule | Feb. 10, 1931 |
| 2,209,991 | McGill | Aug. 6, 1940 |
| 2,253,020 | Daniels | Aug. 19, 1941 |
| 2,317,422 | Thomsen | Apr. 27, 1943 |

FOREIGN PATENTS

| | | |
|---|---|---|
| 304,001 | Germany | Feb. 16, 1918 |